(12) United States Patent
Klier (10) Patent No.: US 8,583,354 B2
(45) Date of Patent: Nov. 12, 2013

(54) CONTINUOUS COMPUTATION OF CENTER OF GRAVITY OF A VEHICLE

(75) Inventor: Willy Klier, West Bloomfield, MI (US)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 13/081,185

(22) Filed: Apr. 6, 2011

(65) Prior Publication Data

US 2012/0259536 A1    Oct. 11, 2012

(51) Int. Cl.
*G06F 17/10* (2006.01)

(52) U.S. Cl.
USPC .............. 701/124; 701/37; 701/70; 701/36; 702/101; 702/173; 180/282

(58) Field of Classification Search
None
See application file for complete search history.

(56) References Cited

U.S. PATENT DOCUMENTS

| | | | |
|---|---|---|---|
| 4,110,605 A | 8/1978 | Miller | |
| 5,136,513 A | 8/1992 | Sol et al. | |
| 5,521,827 A | 5/1996 | Lindberg et al. | |
| 6,526,334 B1 | 2/2003 | Latarnik et al. | |
| 6,615,124 B1 | 9/2003 | Adachi | |
| 7,427,072 B2 | 9/2008 | Brown | |
| 7,440,844 B2 * | 10/2008 | Barta et al. | 701/124 |
| 7,668,645 B2 * | 2/2010 | Lu et al. | 701/124 |
| 7,877,200 B2 * | 1/2011 | Lu et al. | 701/124 |
| 7,877,201 B2 * | 1/2011 | Lu et al. | 701/124 |
| 2004/0064246 A1 * | 4/2004 | Lu et al. | 701/124 |
| 2004/0102894 A1 * | 5/2004 | Holler | 701/124 |
| 2006/0085112 A1 * | 4/2006 | Lu et al. | 701/38 |
| 2007/0078593 A1 * | 4/2007 | Fiedler et al. | 701/124 |
| 2009/0099718 A1 | 4/2009 | Kobetz | |
| 2009/0119000 A1 | 5/2009 | Baumann et al. | |
| 2009/0143926 A1 | 6/2009 | Almalki et al. | |
| 2010/0036597 A1 * | 2/2010 | Fiedler et al. | 701/124 |
| 2010/0094510 A1 | 4/2010 | Lu et al. | |
| 2010/0106360 A1 * | 4/2010 | Lu et al. | 701/29 |
| 2010/0198492 A1 * | 8/2010 | Watanabe | 701/124 |

(Continued)

FOREIGN PATENT DOCUMENTS

FR    2922014    4/2009

OTHER PUBLICATIONS

Willy Klier, Andreas Reim and Dietmar Stapel, Sae Technical Paper Series, No. 2008-01-0582, "Robust Estimation of Vehicle Sideslip Angle—an Approach w/o Vehicle and Tire Models", Apr. 14-17, 2008, (7 pages).
Andreas Reim, Alexander Steinbach, Oliver Oettgen and Dietmar Stapel, 2009 SAE International, No. 2009-01-0430, "Central Sideslip Angle Estimation on a Software Integration Platform," 2009, (5 pages).

(Continued)

*Primary Examiner* — Thomas Tarcza
*Assistant Examiner* — Richard Goldman
(74) *Attorney, Agent, or Firm* — Michael Best & Friedrich LLP (57) ABSTRACT

Systems and methods for computing the center of gravity of a vehicle. One method includes determining a first, second, and third acceleration of the vehicle along an x-axis, a y-axis, and a z-axis; determining a first, second, and third angular rate of the vehicle along the x-axis, the y-axis, and the z-axis; determining a total force acting on the vehicle; and determining an estimated mass of the vehicle. The method also includes computing a center of gravity of the vehicle based on the first acceleration, the second acceleration, the third acceleration, the first angular rate, the second angular rate, the third angular rate, the total force acting on the vehicle, and the estimated mass.

17 Claims, 4 Drawing Sheets

(56) References Cited

U.S. PATENT DOCUMENTS

| | | | |
|---|---|---|---|
| 2011/0022267 A1* | 1/2011 | Murphy | 701/38 |
| 2011/0066320 A1* | 3/2011 | Bechtler et al. | 701/34 |
| 2011/0224895 A1* | 9/2011 | Kroeger | 701/124 |
| 2012/0173133 A1* | 7/2012 | Ranc et al. | 701/124 |
| 2012/0239250 A1* | 9/2012 | Lu et al. | 701/36 |

OTHER PUBLICATIONS

European Patent Office Search Report for Application No. 12163282.2 dated Sep. 19, 2013 (6 pages).

* cited by examiner

CONTINUOUS COMPUTATION OF CENTER OF GRAVITY OF A VEHICLE

Embodiments of the present invention relate to methods and systems for computing the center of gravity of a vehicle.

SUMMARY

The position of the center of gravity ("CoG") with respect to the front or rear axis (defined on an x-coordinate system) of a vehicle is used in many vehicle control systems, such as electronic stability control ("ESC") systems. Many control systems use a constant value for the CoG. Many control systems also assume that any load contained in the vehicle is symmetrically distributed through the vehicle (e.g., over the y-coordinate system). The real position of a vehicle's CoG, however, varies depending on the current load distribution in the vehicle (which may depend, e.g., on whether the vehicle's trunk is loaded or unloaded). Therefore, using an imprecise CoG can cause imprecise target yaw rates, which cause effects that must be compensated for using additional algorithms or costly controller parameter applications in ESC and other vehicle systems.

Using current coordinates of a vehicle's CoG can simplify the control algorithms and can reduce or eliminate the need for additional applications to compensate for an imprecise CoG. In addition, using current coordinates can improve the accuracy and validity range of many different model-based algorithms related to vehicle motions, such as model-based plausibility and estimation of a side slip angle. Furthermore, information about the z-coordinate of the CoG can be used to identify when the load distribution of a vehicle creates a higher risk of rollover. Once this situation is identified, various controllers can be switched to a higher sensitivity mode. The z-coordinate of the CoG can also be used to identify specific load situations, like a load from a trailer or a roof luggage rack, that impact a vehicle's motion.

Embodiments of the invention provide methods and systems for continuously computing the coordinates of a vehicle's CoG. The methods and systems use three angular rates ($\omega_x, \omega_y, \omega_z$) of the vehicle, three accelerations ($a_x, a_y, a_z$) of the vehicle, and additional information about the displacements between the vehicle body and the wheels of the vehicle to calculate the CoG. The CoG calculation is also based on the total vehicle mass at start-up (or standstill). The CoG is continuously computed based on the total force acting on the vehicle as the vehicle is operated, and the mass and force are determined based on displacements between the vehicle body and the wheels and the kinematics of each wheel suspension. The methods and systems also provide information about the z-coordinate of the CoG, which can be used to identify a vehicle with a load distribution that could cause a vehicle rollover. In addition, the methods and systems simplify calculating the CoG.

In one construction, the invention provides a system for computing the center of gravity of a vehicle having a plurality of wheels. The system includes an acceleration module, an angular module, a force module, a mass module, and a computational module. The acceleration module is configured to determine a first acceleration of the vehicle along an x-axis, a second acceleration of the vehicle along a y-axis, and a third acceleration of the vehicle along a z-axis. The angular module is configured to determine a first angular rate of the vehicle along the x-axis, a second angular rate of the vehicle along the y-axis, and a third angular rate of the vehicle along the z-axis. The force module is configured to determine a total force acting on the vehicle. The mass module is configured to determine an estimated mass of the vehicle. The computational module is configured to determine a center of gravity of the vehicle based on the first acceleration of the vehicle along an x-axis, the second acceleration of the vehicle along a y-axis, the third acceleration of the vehicle along a z-axis, the first angular rate of the vehicle along the x-axis, the second angular rate of the vehicle along the y-axis, the third angular rate of the vehicle along the z-axis, the total force acting on the vehicle, and the estimated mass of the vehicle. Furthermore, the system can include a vehicle control module configured to modify control of the vehicle based on the center of gravity.

In another construction, the invention provides a method for computing a center of gravity for a vehicle having a plurality of wheels. The method includes determining a first acceleration of the vehicle along an x-axis, a second acceleration of the vehicle along a y-axis, and a third acceleration of the vehicle along a z-axis; determining a first angular rate of the vehicle along the x-axis, a second angular rate of the vehicle along the y-axis, and a third angular rate of the vehicle along the z-axis; determining a total force acting on the vehicle; and determining an estimated mass of the vehicle. The method also includes computing a center of gravity of the vehicle based on the first acceleration of the vehicle along an x-axis, the second acceleration of the vehicle along a y-axis, the third acceleration of the vehicle along a z-axis, the first angular rate of the vehicle along the x-axis, the second angular rate of the vehicle along the y-axis, the third angular rate of the vehicle along the z-axis, the total force acting on the vehicle, and the estimated mass of the vehicle. Furthermore, the method can include outputting the center of gravity to at least one vehicle control module, and modifying, with the vehicle control module, control of the vehicle based on the center of gravity.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
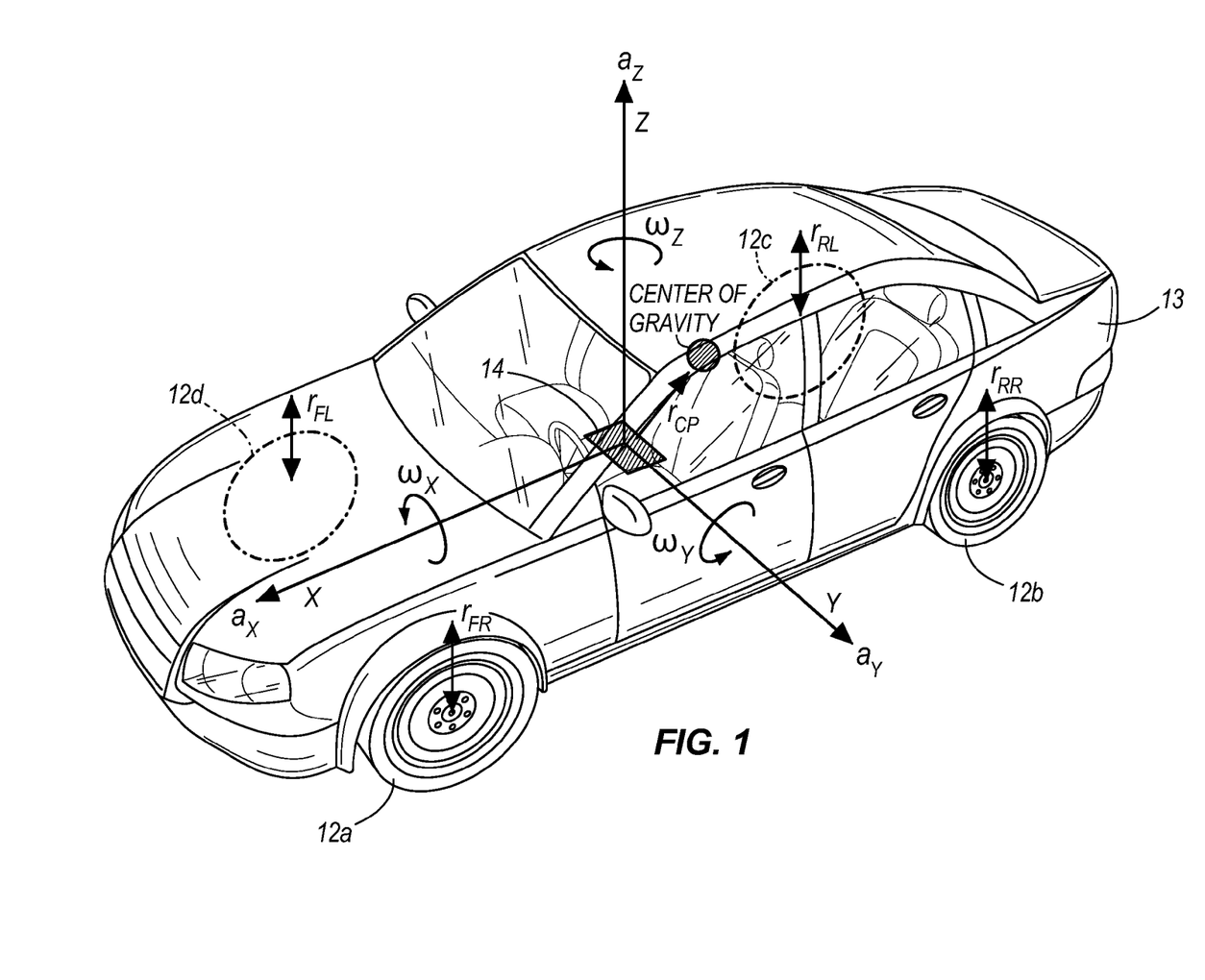
FIG. 1 illustrates a vehicle.

FIG. 1 illustrates a vehicle 10. The vehicle 10 includes a plurality of wheels 12a, 12b, 12c, and 12d, a vehicle body 13, and a control system or unit 14. In some embodiments, the control unit 14 includes a central or domain control unit that includes various sensors and/or modules for monitoring and controlling various components of the vehicle 10. The control unit 14 can communicate with other systems and components included in the vehicle 10 over a controller area network ("CAN") bus or other type of communication channel.

As described in more detail below, the control unit 14 determines the center of gravity ("CoG") of the vehicle 10 based on the current state of the vehicle 10, such as the acceleration and angular rate of the vehicle 10, the displacement between the vehicle's wheels and the vehicle body, and the vehicle's mass. In some embodiments, the control unit 14 determines the acceleration and the angular rate of the vehicle along a coordinate system defined by the physical placement of the control unit 14 in the vehicle 10. As shown in FIG. 1, the control unit 14 defines a measurement point that represents the origin of a coordinate system including an x-axis, a y-axis, and a z-axis. The control unit 14 determines the vehicle's acceleration $(a_X, a_Y, a_Z)$ and angular rate $(\omega_X, \omega_Y, \omega_Z)$ along each axis. As also shown in FIG. 1, the control unit 14 also determines the displacement between the vehicle body 13 and each of the vehicle's wheels $(r_{FR}, r_{RR}, r_{RL}, r_{FL})$, where "FR" stands for "front right", "RR" stands for "rear right," "RL" stands for "rear left," and "FL" stands for "front left." The control unit 14 uses the vehicle's acceleration, angular rate, wheel displacement, and mass to determine the coordinates of the CoG. As shown in FIG. 1, in some embodiments, the control unit 14 determines coordinates of the CoG based on the coordinate system defined by the physical placement of the control unit 14, such that the coordinates define a displacement $(r_{CP})$ from the measurement point or origin (0,0,0) of the coordinate system.

Figure 2:
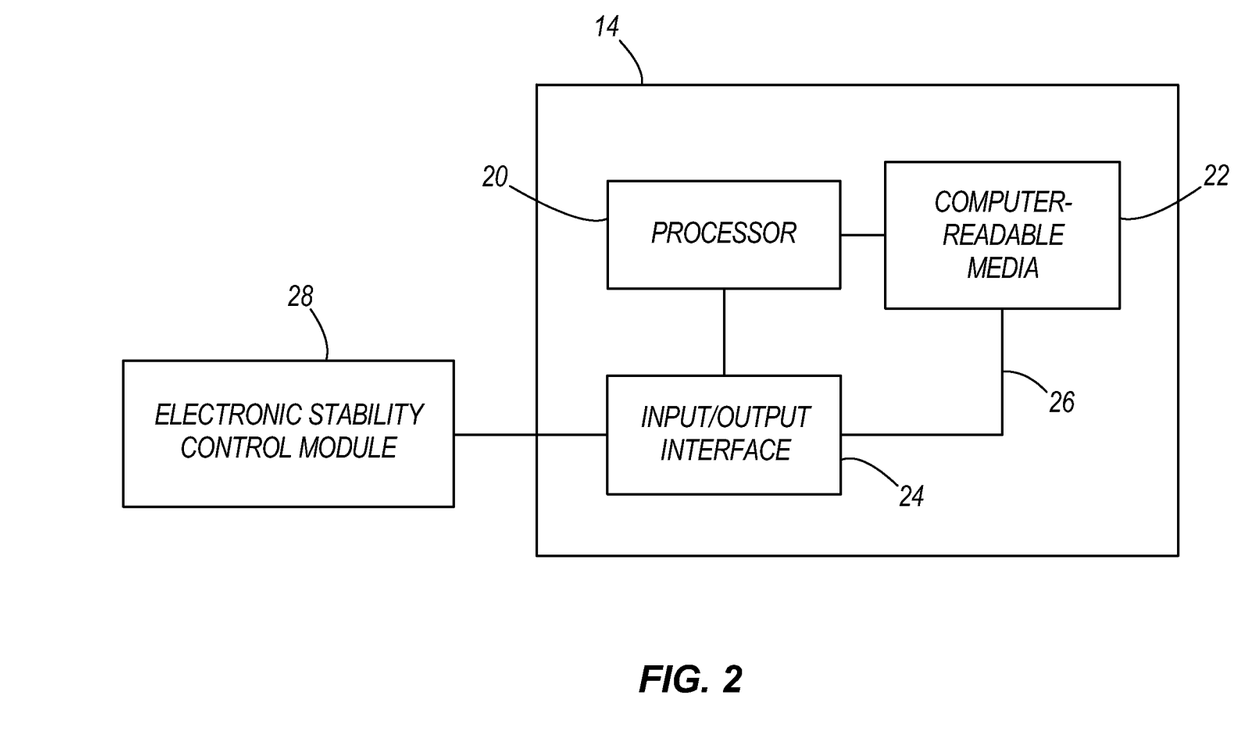
FIG. 2 schematically illustrates a control unit for determining a center of gravity of the vehicle of FIG. 1.

FIG. 2 schematically illustrates the control unit 14 in further detail. As shown in FIG. 2, the control unit 14 includes at least one processor 20, computer-readable media 22, and an input/output interface 24. The processor 20, computer-readable media 22, and input/output interface 24 are connected by one or more connections 26, such as a system bus. It should be understood that although only one processor 20, computer-readable media module 22, and input/output interface 24 are illustrated in FIG. 2, the control unit 14 can include multiple processors 20, computer-readable media modules 22, and/or input/output interfaces 24.

The processor 20 retrieves and executes instructions stored in the computer-readable media 22 and stores data to the computer-readable media 22. The computer-readable media 22 includes volatile memory, non-volatile memory, or a combination thereof. The computer-readable media 22 also includes non-transitory computer-readable medium. The input/output interface 24 receives data from outside the control unit 14 and outputs data outside the control unit 14. For example, as shown in FIG. 2, the input/output interface 24 can communicate with one or more vehicle control modules, such as an electronic stability control ("ESC") module 28. The ESC module 28 senses current operating parameters and conditions of the vehicle 10 and modifies control of the vehicle 10 to keep the vehicle 10 stabilized. Although the ESC module 28 is illustrated in FIG. 2 as a component outside of the control unit 14, in some embodiments it is included in the control unit 14. The input/output interface 24 can also communicate with other components inside the vehicle 10 (e.g., over a CAN) and outside of the vehicle 10. For example, the input/output interface 24 can include a network interface, such as an Ethernet card or a wireless network card, that allows the control unit 14 to send and receive information over a network, such as a local area network or the Internet.

Figure 3:
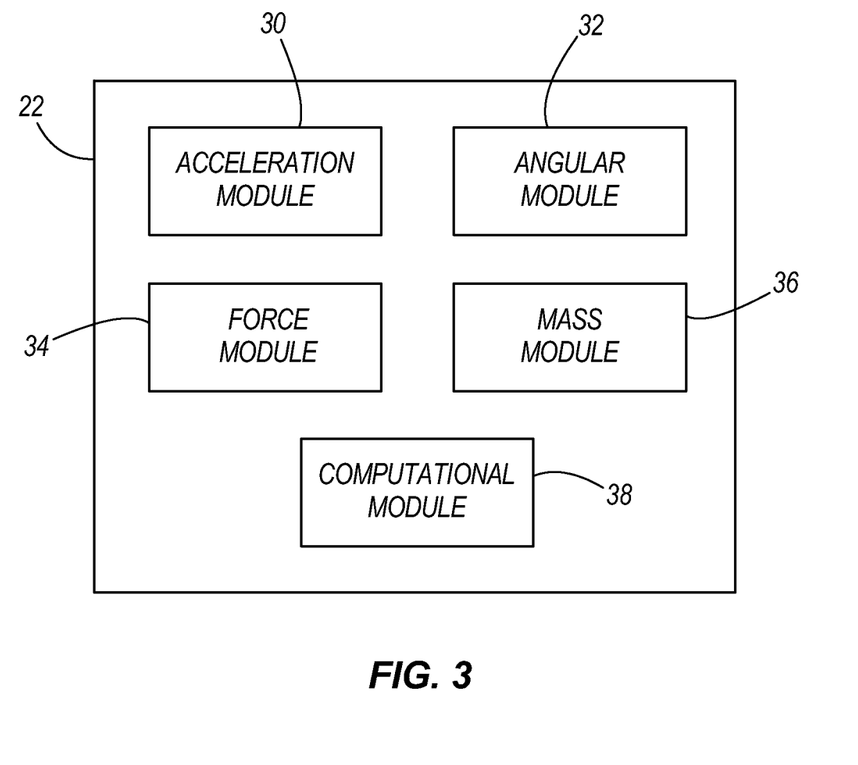
FIG. 3 schematically illustrates computer-readable medium included in the control unit of FIG. 2.

The instructions stored in the computer-readable media 22 include various modules configured to perform particular functionality when executed by the processor 20. FIG. 3 schematically illustrates the computer-readable media 22 according to one embodiment of the invention. As shown in FIG. 3, the computer-readable media 22 includes an acceleration module 30, an angular module 32, a force module 34, a mass module 36, and a computational module 38. The acceleration module 30 determines the acceleration of the vehicle 10 in one or more directions. For example, the acceleration module 30 determines the acceleration of the vehicle 10 along an x-axis, a y-axis, and a z-axis defined by the physical position of the control unit 14 in the vehicle 10 $(a_X, a_Y, a_Z)$. Therefore, the acceleration module 30 receives data from one or more sensors that measure various conditions of the vehicle 10 that allow the acceleration module 30 to determine the vehicle's acceleration (e.g., acceleration sensors, inertial sensors, etc.). The acceleration module 30 processes the received data to determine the acceleration of the vehicle 10 along each axis. Processing the received data can include combining and/or comparing the data with data from other sensors or data stored in the computer readable media 22, filtering the received data, offset-compensating the received data, or a combination thereof.

The angular module 32 determines the angular rate of the vehicle 10 in one or more directions. For example, the angular module 32 determines the angular rate of the vehicle 10 along an x-axis, a y-axis, and a z-axis defined by the position of the control unit 14 in the vehicle 10 $(\omega_{X,Y,Z})$. Therefore, the angular module 32 receives data from one or more sensors that measure various conditions of the vehicle 10 that allow the angular module 32 to determine the vehicle's angular rate (e.g., rotation sensors, inertial sensors, etc.). The angular module 32 processes the data received from the sensors to determine the angular rate of the vehicle 10 along each axis. Processing the received data can include combining and/or comparing the data with data from other sensors or data stored in the computer readable media 22, filtering the received data, offset-compensating the received data, or a combination thereof.

The force module 34 determines the total force acting on the vehicle 10. For example, the force module 34 uses the displacement of the vehicle's wheels from the vehicle body 13, the kinematics of each wheel suspension, and the weight force of the vehicle to determine the total force acting on the vehicle 10. Therefore, the force module 34 receives data from one or more sensors that measure various conditions of the vehicle 10 that allow the force module 34 to determine the total force acting on the vehicle 10. The force module 34 processes the data received from the sensors to determine the total force acting on the vehicle 10 (or an estimation thereof).

The mass module 36 determines the total mass of the vehicle 10, including any load contained in the vehicle 10. In some embodiments, the mass module 36 determines the total mass of the vehicle 10 when the vehicle 10 is initially started (i.e., at the start of an ignition cycle). In other embodiments, the mass module 36 determines the total mass of the vehicle continuously or at predetermined intervals while the vehicle 10 is running. To determine the vehicle's mass, the mass module 36 uses the gravity force and the normal force acting on the vehicle 10. Therefore, the mass module 36 receives data from one or more sensors that measure various conditions of the vehicle 10 that allow the mass module 36 to determine the vehicle's mass. The mass module 36 processes the data received from the sensors to determine the vehicle's total mass (or an estimation thereof). In some embodiments, the mass module 36 also stores the mass estimation to the computer-readable media 22, which allows the mass estimation to be used for multiple computations of the vehicle's CoG.

It should be understood that the sensors that provide data to the acceleration module 30, the angular module 32, the force module 34, and the mass module 36 can be included in the control unit 14 or positioned elsewhere in the vehicle 10. If the sensors are positioned outside of the control unit 14, the sensors can send data to the control unit 14 over a CAN bus or another type of connection.

The computational module 38 receives data from the acceleration module 30, the angular module 32, the force module 34, and the mass module 36 (or from the computer-readable media 22) and determines the vehicle's CoG. As mentioned above, in some embodiments, the computational module 38 outputs the CoG as coordinates based on the coordinate system defined by the physical placement of the control unit 14, such that the coordinates define a displacement ($r_{CP}$) from the origin (0,0,0) of the coordinate system. The calculated CoG can be used by various vehicle control systems, such as the ESC, to modify control of the vehicle based on changes to the CoG. In some embodiments, the computational module 38 determines the CoG at the start of an ignition cycle for the vehicle 10 and determines the CoG again at least once while the vehicle is running. The computational module 38 can determine the CoG at predetermined intervals or continuously.

Figure 4:
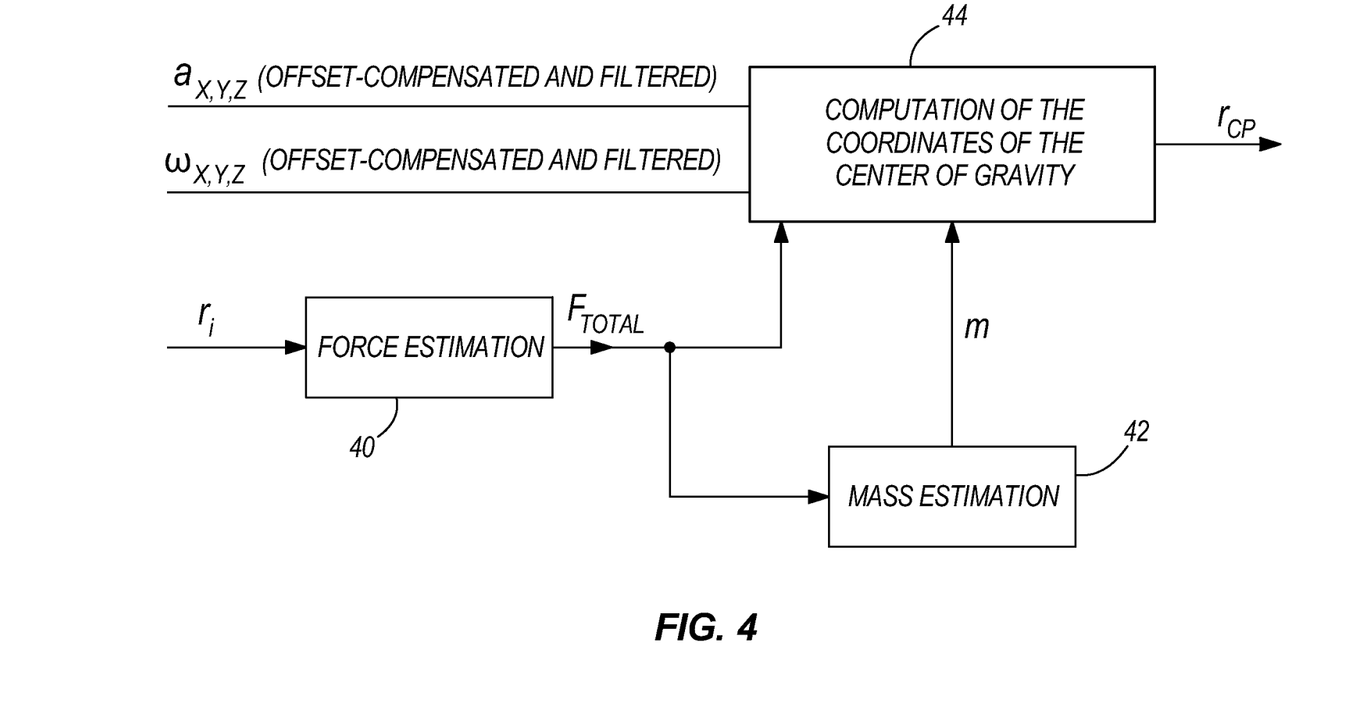
FIG. 4 is a flow chart illustrating a method of computing the center of gravity of a vehicle using the control unit of FIG. 2.

FIG. 4 is a flow chart illustrating a method of computing the center of gravity of the vehicle 10 using the control unit 14. As shown in FIG. 4, the displacement of each vehicle wheel ($r_i$,i=[FR, FL, RR, RL]) is provided to a force estimation function (at 40), which is performed by the force module 34. The output of the force estimation function is a vector ($F_{Total}$) containing the three components of the total force acting on the vehicle 10. The force estimation function assumes that the vehicle 10 behaves as a rigid body in its normal operating range, and the force estimation function knows the displacements between the vehicle body 13 and each of the vehicle's wheels ($r_i$) and the kinematics of each wheel suspension. Therefore, the force estimation function computes a force transformation matrix ($T_i$) to transform the force in the direction of the suspension ($L_i$).

In particular, the force ($F_i^{Li}$) is represented by the following equation:

$$F_i^{Li} := c_i * \Delta r_i + d_i * \dot{r}_i \quad (1)$$

Where the variable $c_i$ represents a stiffness coefficient and the variable $d_i$ represents a damping coefficient. The force estimation function then translates the force into a force represented in the coordinate system L, which includes a plane tangential to the current vehicle position, using the following equation:

$$F_i^L = T_i * F_i^{Li} \quad (2)$$

The sum of this force on each wheel and the weight force, provided by the following equation, provides the total force ($F_{Total}^L$) acting on the vehicle:

$$F_{Total}^L := \sum_{i=1}^{4} T_i * F_i^{Li} + [0 \ 0 \ -m*g]^T \quad (3)$$

Therefore, as illustrated in equations (1) through (3), the force module 34 determines the total force acting on the vehicle 10 by determining a displacement between each of the vehicle's wheels and the vehicle's body, transforming the displacement between each wheel and the vehicle body into a force acting on each wheel, summing the forces acting on each wheel to determine a total force acting on the wheels, and adding the total force acting on the plurality of wheels and a weight force acting on the vehicle 10.

Alternatively, the suspension forces can be computed by nonlinear functions using the following equation:

$$F_i^{Li} := f_c(c_i, \Delta r_i) + f_d(d_i, \dot{r}_i) \quad (4)$$

Choosing one of these models use (i.e., linear or nonlinear) can be determined according to the data available for the dampers and springs of the vehicle's suspension components. As noted above, the output of the force estimation function is a force estimation represented by a vector ($F_{Total}$) including the three components of the total force acting on the vehicle 10.

As shown in FIG. 4, the force estimation ($F_{Total}$) is provided to a mass estimation function (at 42), which is performed by the mass module 36. The output of the mass estimation function is a mass estimation (m) representing the value of the total mass of the vehicle 10, including any load contained in the vehicle 10. As mentioned above, in some embodiments, the mass estimation function is only performed at the beginning of each ignition cycle. When the vehicle 10 is initially started, the mass estimation function assumes that the only forces acting on the vehicle 10 at standstill are the gravity force and the normal force. The mass estimation function also assumes that the vehicle 10 is in an equilibrium condition, as represented by the following equation:

$$F_{Total}^L := \sum_{i=1}^{4} T_i * F_i^{Li} + [0 \ 0 \ -m*g]^T = 0_3 \quad (5)$$

Furthermore, the mass estimation function assumes that in equilibrium condition the displacements of the wheels ($r_i$) are not changing. Therefore, equation (2) described above provides the following relation:

$$F_{i0}^{Li} := c_i * \Delta r_i \quad (6)$$

Accordingly, equations (5) and (6) provide the relation, set forth below, to compute the vehicle mass:

$$\sum_{i=1}^{4} T_{Zi} * (c_i * \Delta r_i) + [00 - m*g]^T = 0_3 \quad (7)$$

As shown in FIG. 4, the mass estimation (m) determined by the mass estimation function is provided to a computation function (at 44), which is performed by the computational module 38. The computation function also receives the force estimation ($F_{Total}$) determined by the force estimation function. Furthermore, the computation function receives acceleration values ($a_X, a_Y, a_Z$) determined by the acceleration module 30, and angular values ($\omega_X, \omega_Y, \omega_Z$) determined by the angular module 32. As described above, the acceleration values and/or the angular values can be offset-compensated and filtered.

To compute the coordinates of the CoG ($r_{CP}$) using the force estimation and the mass estimation, the computation function uses the following equation derived from the kinematic differential equations of a rigid body:

$$r_{CP}^L = [(\tilde{w}_{LR}^L)^2 + \dot{\tilde{w}}_{LR}^L]^{-1} * [m^{-1} * F_{Total}^L - I_3 * {}^R\ddot{r}_{PO}^L] \quad (8)$$

The vector of coordinates represented in the body fixed system of coordinates L between the measurement point ("CU") (i.e., the origin of the coordinate system defined by the physical location of the control unit 14) and the CoG is represented by the following equation:

$$r_{CP}^L := [x_{CP}^L y_{CP}^L z_{CP}^L]^T \quad (9)$$

Accordingly, the skew symmetric matrix of the angular rates is provided by the following equation:

$$\tilde{\omega}_{LR}^L := \begin{bmatrix} 0 & -\omega_{ZCU} & \omega_{YCU} \\ \omega_{ZCU} & 0 & -\omega_{XCU} \\ -\omega_{YCU} & \omega_{XCU} & 0 \end{bmatrix} \quad (10)$$

Similarly, the skew symmetric matrix of the angular accelerations is provided by the following equation:

$$\dot{\tilde{\omega}}_{LR}^L := \begin{bmatrix} 0 & -\dot{\omega}_{ZCU} & \dot{\omega}_{YCU} \\ \dot{\omega}_{ZCU} & 0 & -\dot{\omega}_{XCU} \\ -\dot{\omega}_{YCU} & \dot{\omega}_{XCU} & 0 \end{bmatrix} \quad (11)$$

Therefore, letting the variable m represent the total vehicle mass and the vector $F_{Total}$ represent the total forces acting on the vehicle (e.g., represented in the vehicle-fixed coordinate system), the following equation represents the vector of translation, gravity-compensated accelerations of the vehicle at the measurement point ("CU") represented in the vehicle-fixed coordinates system L:

$${}^R\ddot{r}_{PO}^L := [a_{XCU} a_{YCU} a_{ZCU}]^T \quad (12)$$

As described above, once the coordinates of the current CoG are obtained, they can be used to modify the operation of one or more vehicle control systems, such as an ESC. For example, the current CoG can be used to switch a control system to a different mode, such as more sensitive mode, or turn off a particular control system. The CoG can also be used to determine how a load is distributed through a vehicle to provide better and safer vehicle control. The CoG can also be stored to the computer-readable media 22 or other media to use at a later time and/or combine with other CoG or non-CoG information. This tracked information can be used to further modify vehicle control or design more adaptive vehicle controls.

Various features and advantages of the invention are set forth in the following claims.

What is claimed is:

1. A system for computing a center of gravity of a vehicle having a plurality of wheels, the system comprising:
   non-transitory computer readable medium encoded with a plurality of executable modules, the wherein the plurality of executable modules include
   an acceleration module configured to determine a first acceleration of the vehicle along an x-axis, a second acceleration of the vehicle along a y-axis, and a third acceleration of the vehicle along a z-axis;
   an angular module configured to determine a first angular rate of the vehicle along the x-axis, a second angular rate of the vehicle along the y-axis, and a third angular rate of the vehicle along the z-axis;
   a force module configured to determine a total force acting on the vehicle based on a displacement of each of the plurality of wheels from a body of the vehicle;
   a mass module configured to determine an estimated mass of the vehicle including any load included in the vehicle; and
   a computational module configured to determine a center of gravity of the vehicle based on the first acceleration of the vehicle along an x-axis, the second acceleration of the vehicle along a y-axis, the third acceleration of the vehicle along a z-axis, the first angular rate of the vehicle along the x-axis, the second angular rate of the vehicle along the y-axis, the third angular rate of the vehicle along the z-axis, the total force acting on the vehicle, and the estimated mass of the vehicle.

2. The system of claim 1, wherein the plurality of modules further includes a vehicle control module configured to modify control of the vehicle based on the center of gravity.

3. The system of claim 2, wherein the vehicle control module includes an electronic stability control module.

4. The system of claim 1, wherein the computational module is further configured to determine the center of gravity of the vehicle at a start of an ignition cycle and at least once while the vehicle is running.

5. The system of claim 1, wherein the mass module is configured to determine the estimated mass of the vehicle when the vehicle is at a standstill.

6. The system of claim 1, wherein the mass module is configured to determine the estimated mass of the vehicle at a start of an ignition cycle.

7. The system of claim 1, wherein the force module is further configured to determine the total force acting on the vehicle by transforming the displacement between each of the plurality of wheels and the body of the vehicle into a force acting on each the plurality of wheels, summing the forces acting on each of the plurality of wheels to determine a total force acting on the plurality of wheels, and adding the total force acting on the plurality of wheels and a weight force acting on the vehicle.

8. The system of claim 1, wherein the x-axis, y-axis, and z-axis are defined based on a position of a domain control unit included in the vehicle.

9. The system of claim 1, wherein the acceleration module is further configured to filter each of the first, second, and third accelerations of the vehicle and the angular module is further configured to filter each of the first, second, and third angular rates of the vehicle.

10. A method for computing a center of gravity for a vehicle having a plurality of wheels, the method comprising:
    determining a first acceleration of the vehicle along an x-axis, a second acceleration of the vehicle along a y-axis, and a third acceleration of the vehicle along a z-axis;
    determining a first angular rate of the vehicle along the x-axis, a second angular rate of the vehicle along the y-axis, and a third angular rate of the vehicle along the z-axis;
    determining a total force acting on the vehicle based on a displacement of each of the plurality of wheels from a body of the vehicle;
    determining an estimated mass of the vehicle including any load included in the vehicle; and
    computing, by at least one processor, a center of gravity of the vehicle based on the first acceleration of the vehicle along an x-axis, the second acceleration of the vehicle along a y-axis, the third acceleration of the vehicle along a z-axis, the first angular rate of the vehicle along the x-axis, the second angular rate of the vehicle along the y-axis, the third angular rate of the vehicle along the z-axis, the total force acting on the vehicle, and the estimated mass of the vehicle.

11. The method of claim 10, further comprising outputting the center of gravity to at least one vehicle control module and modifying, with the vehicle control module, control of the vehicle based on the center of gravity.

12. The method of claim 11, wherein the modifying control of the vehicle based on the center of gravity includes modifying control of the vehicle by an electronic stability control module.

13. The method of claim 10, wherein the computing the center of gravity of the vehicle includes computing the center of gravity of the vehicle at a start of an ignition cycle and at least once while the vehicle is running.

14. The method of claim 10, wherein the determining the estimated mass of the vehicle includes determining the estimated mass of the vehicle when the vehicle is at a standstill.

15. The method of claim 10, wherein the determining a total force acting on the vehicle includes transforming the displacement between each of the plurality of wheels and the body of the vehicle into a force acting on each the plurality of wheels, summing the forces acting on each of the plurality of wheels to determine a total force acting on the plurality of wheels, and adding the total force acting on the plurality of wheels and a weight force acting on the vehicle.

16. The method of claim 10, wherein the determining the first, second, and third acceleration of the vehicle includes defining the x-axis, y-axis, and z-axis based on a position of a control unit included in the vehicle.

17. The method of claim 10, wherein the determining the first, second, and third angular rate of the vehicle includes defining the x-axis, y-axis, and z-axis based on a position of a control unit included in the vehicle.

* * * * *